(12) United States Patent
Wang et al.

(10) Patent No.: US 8,725,684 B1
(45) Date of Patent: May 13, 2014

(54) SYNCHRONIZING DATA STORES

(75) Inventors: Lidong Wang, Bellevue, WA (US); Qi Zhu, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 70 days.

(21) Appl. No.: 13/076,485

(22) Filed: Mar. 31, 2011

(51) Int. Cl.
*G06F 7/00* (2006.01)
*G06F 17/00* (2006.01)

(52) U.S. Cl.
USPC .......................................... 707/613; 707/687

(58) Field of Classification Search
None
See application file for complete search history.

(56) References Cited

U.S. PATENT DOCUMENTS 8,230,191 B2 * 7/2012 Noguchi et al. .............. 711/165
2007/0118386 A1 * 5/2007 Mueller et al. .................. 705/1

OTHER PUBLICATIONS

Lane et al, Oracle Data Warehousing Guide Dec. 2003, 10g Release 1., (10.1), 806 Pages.*

Chappell et al., Guaranteed Messaging With JMS Apr. 1, 2001, sys-con.com, http://java.sys-con.com/node/36239.*

Chappell, JMS URL Syntax proposal Nov. 1, 2002, marc.info, http://marc.info/?l=axis-dev&m=103617964921940.*

Unknown, Oracle Warehouse Builder User's Guide Apr. 2009, 10g Release 2 (10.2.0.2), 932 pages (only pp. 2-1, 11-4, 11-5 included.*

Acknowledge | Define Acknowledge at Dictionary.com 2013 [accessed Jan. 10, 2013], dictionary.com, http://dictionary.reference.com/browse/acknowledge.*

Schedule | Define Schedule at Dictionary.com 2013 [accessed Jan. 10, 2013], dictionary.com, http://dictionary.reference.com/browse/schedule.*

Howe, run time Sep. 14, 2001, [accessed Jan. 10, 2013], Free On-Line Dictionary of Computing, http://foldoc.org/runtime.*

Seilinger, Access Path Selection in a Relational Database Management System 1979, Association of Computing Machinery, pp. 23-34.*

Silberschatz et al., Operating System Concepts 1999, John Wiley & Sons, 5th Ed, pp. 100-101.*

* cited by examiner

*Primary Examiner* — Jason Liao
(74) *Attorney, Agent, or Firm* — Thomas Horstemeyer, LLP

(57) ABSTRACT

Disclosed are various embodiments for synchronizing data stores. A notification is received indicating that a write transaction was performed to a data store. The notification includes a path used by the write transaction. When a predetermined delay has passed after the receipt of the notification, a read is performed from the path included in the notification. In response to at least completion of the read, data returned by the read is written to a different data store.

21 Claims, 5 Drawing Sheets

SYNCHRONIZING DATA STORES

BACKGROUND

Online users interact with search engines to find many different types of information stored on a network such as the Internet or the World Wide Web. The search engine returns summaries for network content that most closely match a user's search query. The search engine uses an index to perform the search query. The index may be stored in a location that is separate from the content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to synchronizing a transactional data store with a data store. A producer process writes data to the replicated data store. Another consumer process reads back the data from the replicated data store and writes the data to the transactional data store. However, because writes by the producer can take hours to be distributed through the replicated data store, a delay is enforced before the consumer reads back the data in order to write to the transactional data store. This delay increases the likelihood that the replicated data store is actually consistent, i.e., that the write has been replicated to all hosts in the replicated data store. The delay can be configured to achieve a particular probability of consistency. For example, in a particular configuration a delay of 5 minutes may result in a 90% likelihood that the eventually consistent replicated data store is actually consistent. In the following discussion, a general description of the system and its components is provided, followed by a discussion of the operation of the same.

Figure 1:
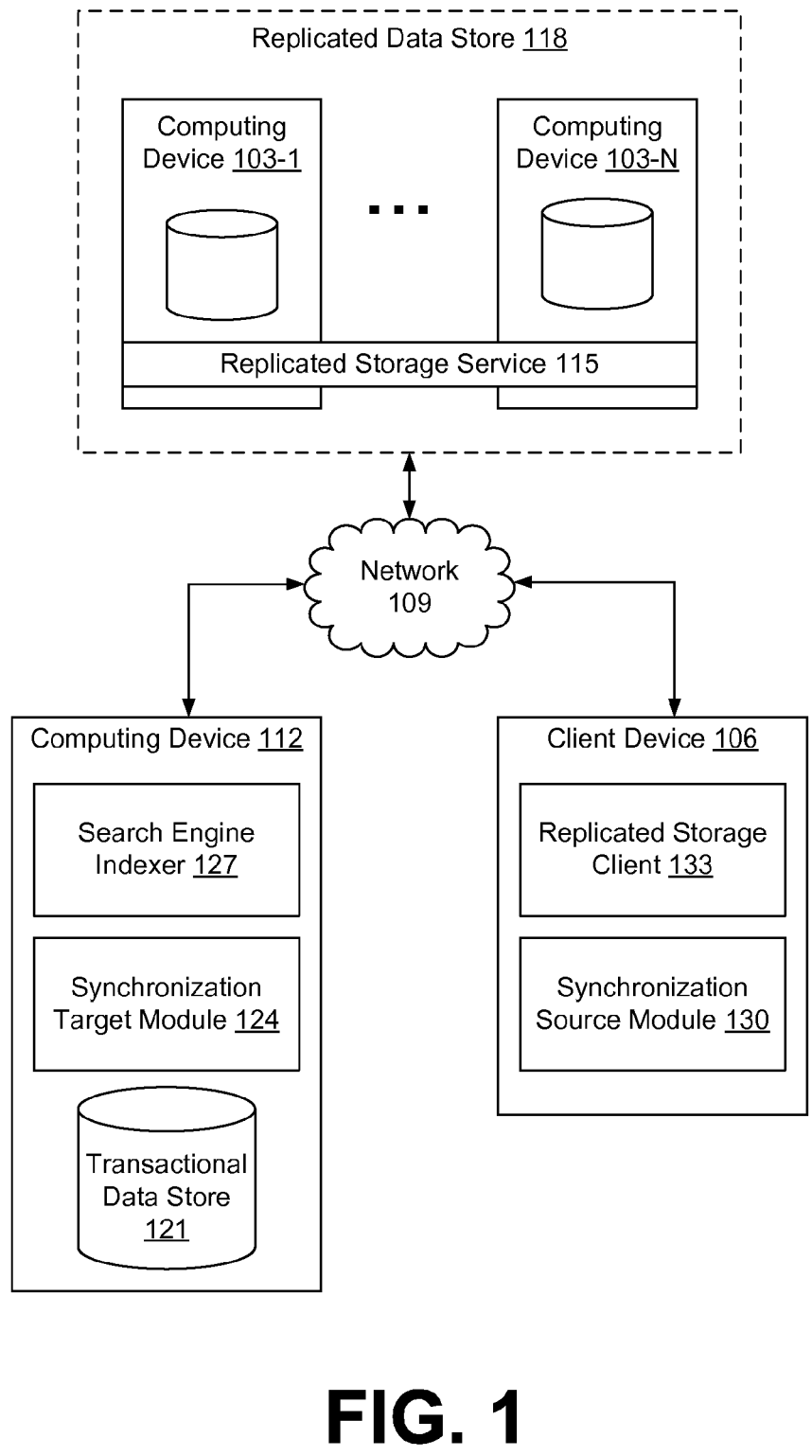
FIG. 1 is a drawing of a networked environment according to one embodiment of the present disclosure.

With reference to FIG. 1, shown is a networked environment 100 according to various embodiments. The networked environment 100 includes a plurality of computing devices 103-1 . . . 103N in data communication with one or more client devices 106 by way of a network 109. The computing device 103 is also in data communication with one or more computing devices 112 by way of the network 109. The network 109 includes, for example, the Internet, intranets, extranets, wide area networks (WANs), local area networks (LANs), wired networks, wireless networks, or other suitable networks, etc., or any combination of two or more such networks.

Each of the computing devices 103, 112 may comprise, for example, a server computer or any other system providing computing capability. Alternatively, a plurality of computing devices 103 or computing devices 112 may be employed that are arranged, for example, in one or more server banks or computer banks or other arrangements. A plurality of computing devices 103 or computing devices 112 together may comprise, for example, a cloud computing resource, a grid computing resource, and/or any other distributed computing arrangement. Such computing devices 103 or computing devices 112 may be located in a single installation or may be distributed among many different geographical locations. For purposes of convenience, the computing device 103 and the computing device 112 are each referred to herein in the singular. Even though the computing device 103 and the computing device 112 are referred to in the singular, it is understood that a plurality of computing devices 103 or computing devices 112 may be employed in various arrangements.

Components executed on the computing devices 103 cooperate to implement a replicated storage service 115, which operates to receive data and to replicate this data among the computing devices 103. Each of the computing devices 103 acts as a replication host, thus forming a replicated data store 118 that is accessible over the network 109. Data written to the replicated data store 118 is not guaranteed to be available at the next read transaction, because the data may not yet be distributed to all the hosts 103-A . . . 103-N. The replicated data store 118 is instead guaranteed to be eventually consistent within a specific commitment period, which may be on the order of dozens of hours.

While the replicated data store 118 made available by the replicated data store 118 executing in the computing device 103 is only eventually consistent, a transactional data store 121 accessible to the computing device 112 is strongly consistent, such that data written in one transaction is available at the next read. The transactional data store 121 may be implemented, for example, by a relational database management system (RDMS). While discussed herein as a single data store, the transactional data store 121 may be representative of a plurality of data stores as can be appreciated. The data stored in the transactional data store 121, for example, is associated with the operation of the various applications and/or functional entities described below.

Various applications and/or other functionality may be executed in the computing device 112 according to various embodiments. The components executed on the computing device 112, for example, include a synchronization target module 124. The synchronization target module 124 is executed to synchronize data stored in the strongly consistent transactional data store 121 with data stored in the eventually consistent replicated data store 118. The synchronization target module 124 operates in conjunction with a synchronization source application, as explained in further detail below.

In some embodiments, the synchronization target module 124 is used by a search engine indexer 127. The search engine indexer 127, if present, is executed to index content stored in the replicated data store 118. Once indexed, the content can be found using a search query. To create an index, the indexer 127 reads content from the replicated data store 118, parses the content, and writes the index to the transactional data store 121. Synchronization methods are used during this process, as described herein, because the transactional data store 121 is strongly consistent while the replicated data store 118 is only eventually consistent.

The components executed on the computing device 112 and the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

Having discussed the computing device 112, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications and/or functionality such as a synchronization source module 130. The synchronization source module 130 may run in conjunction with a client application 133. The client application 133 acts as a client with respect to the replicated data store 118. That is, the client application 133 reads and/or writes to the replicated data store 118 through the replicated storage service 115. The client device 106 may be configured to execute applications beyond the synchronization source module 130, such as, for example, browser applications, email applications, instant message applications, and/or other applications.

Figure 2:
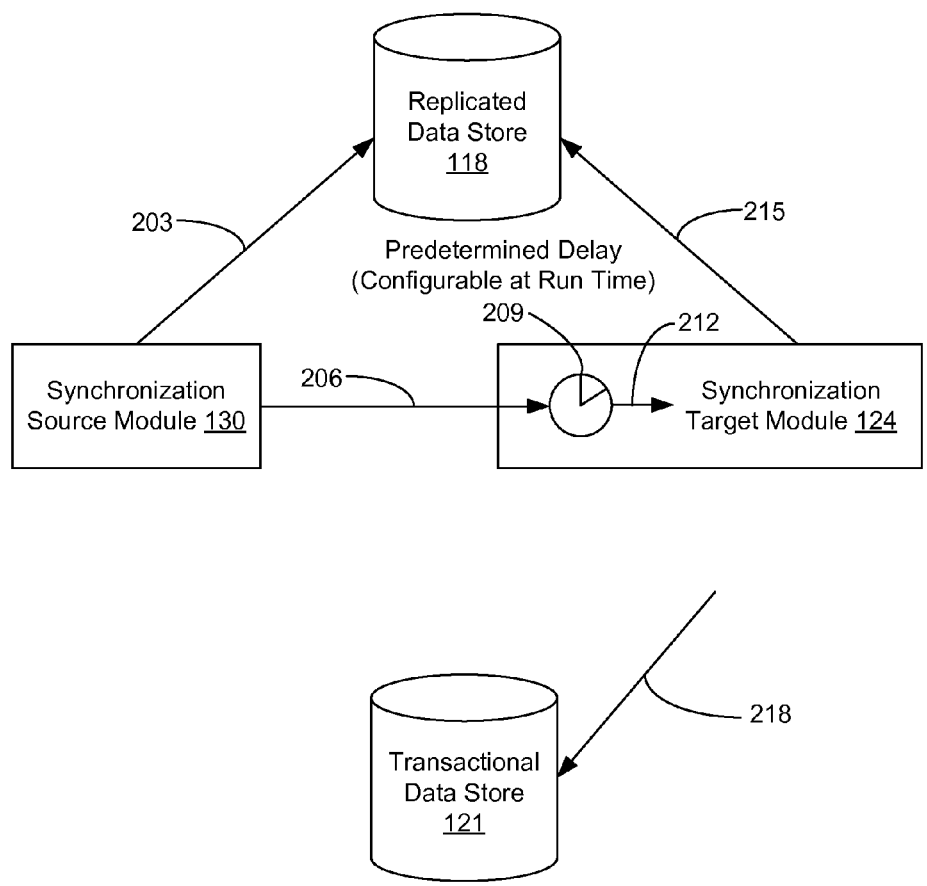
FIG. 2 is a drawing depicting the interactions between the synchronization source module and the synchronization target module according to various embodiments of the present disclosure.

Referring next to FIG. 2, a general description is provided for the operation of some of the components of the networked environment 100 of FIG. 1, according to various embodiments of the present disclosure. Specifically, FIG. 2 describes interactions between the synchronization source module 130 and the synchronization target module 124.

To begin, at event 203 the synchronization source module 130 writes data to the replicated data store 118, using the replicated storage service 115. At event 206 the synchronization source module 130 notifies the synchronization target module 124 about the write transaction. The notification includes a path or location of the write, which the synchronization target module 124 can use to read back the data. The notification may be implemented using any guaranteed messaging framework. In some embodiments, the notification uses the Java Message Service (JMS).

At block 209, a predetermined delay occurs before processing the write notification. The predetermined delay is configurable at run time. This delay increases the likelihood that the replicated data store 118 is actually consistent, i.e., that the replicated data store 118 has replicated the write to all hosts. Therefore, once the delay expires at event 212, the synchronization target module 124 acts on the notification by reading, at block 215, data from the replicated data store 118. The read transaction uses the path included in the notification. At block 218, the synchronization target module 124 writes the data obtained at block 215 to the transactional data store 121.

In this manner, the synchronization source module 130 and the synchronization target module 124 cooperate to synchronize the transactional data store 121 with the replicated data store 118. In some embodiments, the delay period between the write to the replicated data store 118 and the read back from the replicated data store 118 is a parameter that is configurable at run-time. The probability that the replicated storage service 115 has reached consistency generally increases with time. By empirically determining whether the replicated storage service 115 has reached consistency after various periods of time, the delay period can be tuned to reach a particular probability of consistency. For example, it may be determined that a five minute delay produces a 90% probability of consistency.

Figure 3:
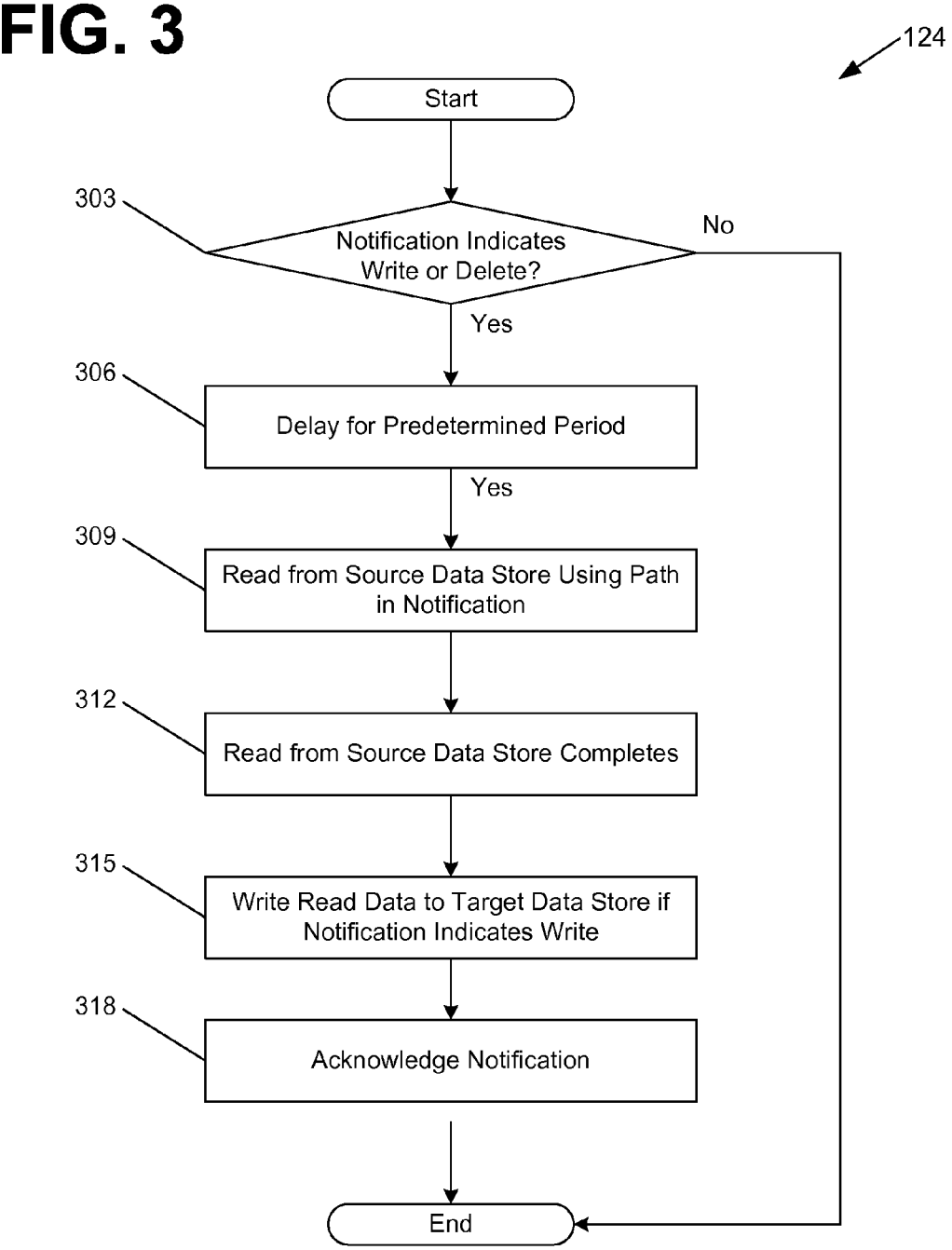
FIG. 3 and FIG. 4 are flowcharts illustrating examples of functionality implemented as portions of a synchronization target application executed in a computing device in the networked environment of FIG. 1 according to various embodiments of the present disclosure.

Turning now to FIG. 3, shown is a flowchart that provides one example of the operation of a portion of the synchronization target module 124 (FIG. 1) executed on a computing device 112 (FIG. 1) according to various embodiments. It is understood that the flowchart of FIG. 3 provides merely an example of the many different types of functional arrangements that may be employed to implement the operation of the portion of the synchronization target module 124 as described herein. As an alternative, the flowchart of FIG. 3 may be viewed as depicting an example of steps of a method implemented in the computing device 112 (FIG. 1) according to one or more embodiments.

Beginning at box 303, the synchronization target module 124 receives a notification and determines the type of the notification. If the notification indicates that the synchronization source module 130 (FIG. 1) has performed a write to, or a delete from, the source data store such as the replicated data store 118, then processing continues at block 306. If the notification is a different type, then the process of FIG. 3 is complete. Depending on the implementation of the notification mechanism, this determination of notification type may be performed by code other than the synchronization target module 124, for example, the notification system which invokes the synchronization target module 124.

As described above, the source data store is distributed among multiple hosts, with a master host replicating the write transactions to multiple slaves. This replication means that the write completes asynchronously, and that the write may not be completed for many hours, depending on the configuration of the source data store. At box 306, the synchronization target module 124 delays for a predetermined period of time before using the path to read back from the source data store. As should be appreciated, the delay may be blocking or non-blocking, depending on the implementation. That is, during the delay the process of FIG. 4 may be blocked from executing and then unblocked after the delay. Alternatively, the process of FIG. 4 may not block but may instead periodically return control and be invoked again to check for expiration of the delay period.

The delay between the write by the synchronization source module 130 and the read by the synchronization target module 124 increases the likelihood that the write by the has been replicated throughout the source data store. Furthermore, the particular delay period may be chosen so that the likelihood meets a specific threshold. For example, a 90% probability that the write is actually consistent may require a five minute delay, while a 95% probability may require a nine minute delay.

Next, at box 309, when the delay period has expired, the synchronization target module 124 reads from the source data store. The write notification received at box 303 includes the path or location of the write within the source data store, and the read at box 309 uses this path. At box 312, the read from the source data store completes. At box 315, in response to at least the read completion, if the notification at box 303 is a write notification, the synchronization target module 124 writes the data returned by the read at box 309 to a target data store, such as the transactional data store 121. In some embodiments, the write at box 315 may require fulfillment of other conditions in addition to the read completion. For example, the write at box 315 may be further conditioned on a successful completion of the read, such that the write does not occur if the read fails at box 309 fails.

Next, at box 318 the synchronization target module 124 acknowledges the notification received from the synchronization source module 130 at block 303. In some embodiments, notifications are held in a queue and the acknowledgement removes the notification from the queue, thus avoiding duplicate processing of the notification. In other embodiments, the act of reading the notification removes it from the queue. Thus, the acknowledgment in block 318 is optional, depending on the implementation.

Figure 4:
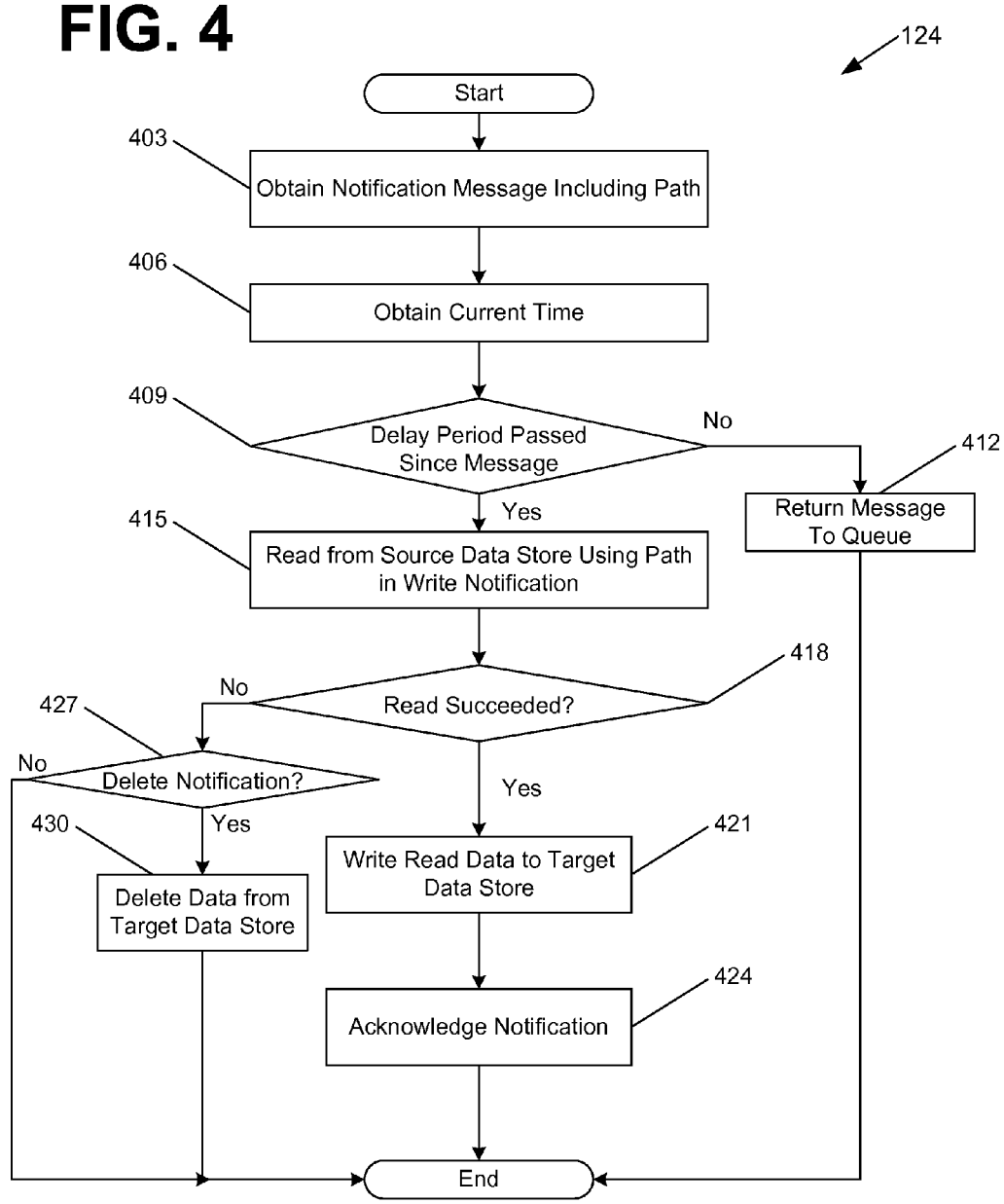

Moving on to FIG. 4, shown is a flowchart that provides one example of the operation of a portion of the synchronization target module 124 (FIG. 1) executed on a computing device 112 (FIG. 1) according to various embodiments. It is understood that the flowchart of FIG. 4 provides merely an example of the many different types of functional arrangements that may be employed to implement the operation of the portion of the synchronization target module 124 as described herein. As an alternative, the flowchart of FIG. 4 may be viewed as depicting an example of steps of a method implemented in the computing device 112 (FIG. 1) according to one or more embodiments.

Beginning at box 403, the synchronization target module 124 obtains a notification message from a message queue. In some embodiments, this notification is a write notification indicating that the synchronization source module 130 (FIG. 1), which acts as the synchronization peer of the synchronization target module 124, has performed a write to the replicated data store 118 (FIG. 1). In some embodiments, this notification is a delete notification indicating that the synchronization source module 130 (FIG. 1), which acts as the synchronization peer of the synchronization target module 124, has deleted data from the replicated data store 118 (FIG. 1). The notification message received at box 403 includes the path or location of the write or delete within the replicated data store 118. This path is used later by the synchronization target module 124 to read the data back from the replicated data store 118. The message queue may be provided by any service or mechanism which implements guaranteed message delivery between computers. In some embodiments, the message queue is provided by Java Message Service (JMS)

To synchronize with the synchronization source module 130, the synchronization target module 124 reads back the data written by the synchronization source module 130, and writes this data to the transactional data store 121. However, as described above, the source data store is distributed among multiple hosts, with a master host replicating the write transactions to multiple slaves. Thus, the write may not be completed for many hours, depending on the configuration of the source data store. The synchronization target module 124 therefore implements a delay before reading the data back from the replicated data store 118. This delay increases the likelihood that the write by the synchronization source module 130 has been replicated throughout the source data store. Furthermore, the particular delay period may be chosen so that the likelihood meets a specific threshold. One implementation of this delay is described below. However, other delay implementations are possible, as should be appreciated.

Having received a write or delete notification message at box 403, at box 406 the synchronization target module 124 obtains the current time. The current time may be obtained, for example, through a function provided by the operating system call, library, execution environment, or any other time provider. Next, at box 409 the synchronization target module 124 uses the current time to determine whether a predetermined delay period has passed since the notification message was received at box 403. For example, the current time may be compared to a timestamp saved by the synchronization target module 124 at the time the notification message was received.

If the synchronization target module 124 determines at box 409 that the delay has not passed, then at box 412 the notification message is returned to the message queue and the process of FIG. 4 is complete. Since the message is returned to the queue, the message service will invoke the process of FIG. 4 at a future time. If instead the synchronization target module 124 determines at box 409 that the predetermined delay period has passed, then at box 415 the synchronization target module 124 reads from the replicated data store 118, using the path included in the notification message.

Next, at box 418 the synchronization target module 124 determines whether the read at box 415 has completed successfully. If it is determined at box 418 that the read did complete successfully, then processing continues at box 421. At box 421, the synchronization target module 124 finishes the synchronization process by writing the data returned by the read at box 415 to the transactional data store 121. Having written the data, at box 424 the synchronization target module 124 acknowledges the message received at box 403. Once the message is acknowledged, the message delivery service will not invoke the process of FIG. 4 until a new message is received. The process of FIG. 4 is then complete.

If instead it is determining at box 418 that the read did not complete successfully, then processing moves to box 427, where the synchronization target module 124 determines whether the notification message indicates a delete was performed on the replicated data store 118. If the notification message does not indicate a delete, the process of FIG. 4 is complete. If the notification message does indicate a delete, then at box 430 the synchronization target module 124 deletes from the transactional data store 121, using the path included in the notification message. The process of FIG. 4 is then complete.

Figure 5:
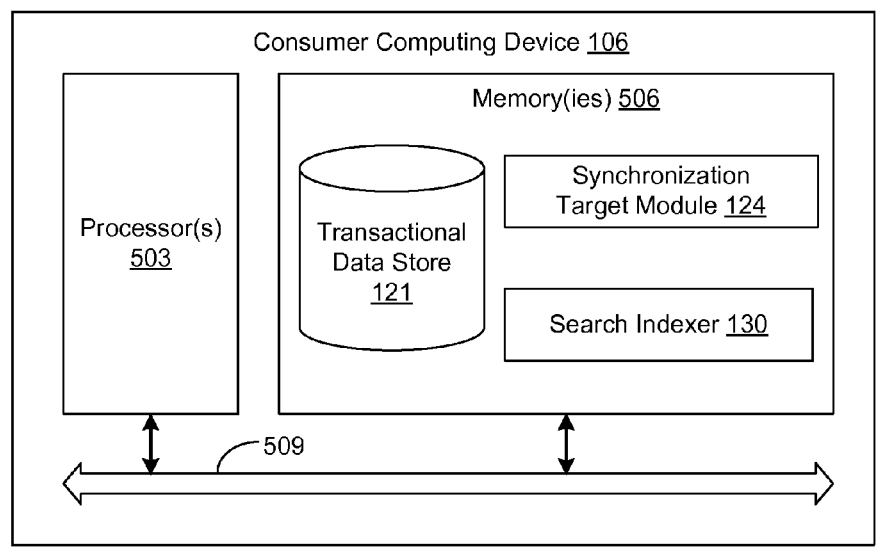
FIG. 5 is a schematic block diagram that provides one example illustration of a computing device employed in the networked environment of FIG. 1 according to various embodiments of the present disclosure.

With reference now to FIG. 5, shown is a schematic block diagram of the computing device 112 according to an embodiment of the present disclosure. The computing device 112 includes at least one processor circuit, for example, having a processor 503 and a memory 506, both of which are coupled to a local interface 509. To this end, the client device 106 may comprise, for example, at least one client computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the synchronization target module 124 and potentially other applications. In addition, an operating system may be stored in the memory 506 and executable by the processor 503.

It is understood that there may be other applications that are stored in the memory 506 and are executable by the processor 503, as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the synchronization target module 124, the synchronization source module 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the synchronization target module 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in flowcharts of FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the synchronization target module 124 and the synchronization source module 130, that comprises software or code can be embodied in any non-transitory computer-readable medium for use by or in connection with an instruction execution system such as, for example, processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s)

Therefore, the following is claimed:

1. A non-transitory computer-readable medium embodying a program executable in at least one of a plurality of computing devices, the program comprising:
   code that determines a delay based on a probability of consistency for an eventually consistent data store, wherein the eventually consistent data store comprises a plurality of component data stores replicated across the plurality of computing devices and wherein the probability of consistency is less than one-hundred percent;
   code that obtains a message from a queue, the message indicating that a write transaction to the eventually consistent data store was performed and including a path used by the write transaction, wherein the write transaction to one of the component data stores is guaranteed to be replicated to another one of the component data stores within the delay, such that data included in the write transaction is guaranteed to be returned in a subsequent read transaction from the another one of the component data stores after passage of the delay;
   code that, in response to obtaining the message, obtains a current time;
   code that determines, based at least on the current time, whether the delay has passed since a receipt of the message;
   code that, if the delay has not passed, returns the message to the queue;
   code that, if the delay has passed, performs a read from the eventually consistent data store using the path included in the message;
   code that determines whether the read from the eventually consistent data store was successful; and
   code that, if the read from the eventually consistent data store was successful, writes data returned by the read from the eventually consistent data store to a strongly consistent data store and acknowledges the message, wherein the strongly consistent data store guarantees that data written in the write transaction to the strongly consistent data store is available in a subsequent transaction involving the strongly consistent data store.

2. The non-transitory computer-readable medium of claim 1, the program further comprising code that, if the read from the eventually consistent data store was not successful, acknowledges the message without writing the data returned by the read to the strongly consistent data store.

3. The non-transitory computer-readable medium of claim 1, wherein the message is delivered using a guaranteed messaging framework.

4. The non-transitory computer-readable medium of claim 1, wherein the write transaction is performed by a producer process and the read is performed by a consumer process.

5. A method comprising:
   determining, via at least one of a plurality of computing devices, a delay based on an empirically determined probability of consistency for an eventually consistent data store comprising a plurality of component data stores replicated across the plurality of computing devices, wherein the probability of consistency is less than one-hundred percent and such that a write transaction to one of the plurality of component data stores is guaranteed to be replicated to remaining ones of the plurality of component data stores within the delay and such that data included in the write transaction is guaranteed to be returned in a subsequent read transaction from another one of the plurality of component data stores after passage of the delay;
   determining, via at least one of the plurality of computing devices, whether a notification indicates that the write transaction was performed to a source data store, wherein the source data store comprises the eventually consistent data store;
   if the notification indicates that the write transaction was performed to the source data store, performing a read, via at least one of the plurality of computing devices, from a location specified by a path included in the notification when the delay has passed after receipt of the notification; and
   in response to at least completion of the read, writing data, via at least one of the plurality of computing devices, returned by the read to a target data store, wherein the target data store comprises a strongly consistent data store that guarantees that the data included in the write transaction to the strongly consistent data store is available in a subsequent transaction involving the strongly consistent data store.

6. The method of claim 5, wherein the notification includes the path used by the write transaction.

7. The method of claim 5, wherein the path comprises a Uniform Resource Locator (URL).

8. The method of claim 5, wherein the delay is configurable at run-time.

9. The method of claim 5, wherein the notification is received through a guaranteed delivery message service.

10. The method of claim 5, wherein the notification is received through a guaranteed messaging framework.

11. The method of claim 5, wherein writing the data returned by the read is conditioned on the read from the source data store being successful.

12. The method of claim 5, further comprising acknowledging, by at least one of the plurality of computing devices, the notification after writing the data returned by the read.

13. The method of claim 5, further comprising:
   if the notification indicates that a delete transaction was performed to the source data store, reading, via at least one of the plurality of computing devices, using the path included in the notification when the delay has passed after the receipt of the notification; and
   in response to an unsuccessful completion of the read, deleting, via the at least one computing device, the data included in the write transaction using the path included in the notification.

14. The method of claim 5, wherein the write transaction is performed by a producer process and the read transaction is performed by a consumer process.

15. A system comprising:
   a plurality of computing devices; and
   synchronization target code implemented in at least one of the plurality of computing devices, the synchronization target code comprising:
   logic that determines a delay period based on a probability of consistency for an eventually consistent data store, wherein the eventually consistent data store comprises a plurality of component data stores replicated across the plurality of computing devices and wherein the probability of consistency is less than one-hundred percent;
   logic that examines a queued message indicating that a write transaction to a source data store was performed, the queued message including a path used by the write transaction, wherein the source data store comprises the eventually consistent data store;

logic that, in response to expiration of the delay period, performs a read from the source data store using the path included in the queued message; and logic that, in response to at least completion of the read from the source data store, writes data returned by the read to a target data store and acknowledges the queued message, wherein the target data store comprises a strongly consistent data store that guarantees that data written in the write transaction to the strongly consistent data store is available in a subsequent transaction involving the strongly consistent data store.

16. The system of claim 15, wherein the synchronization target code further comprises logic that retrieves the queued message from a message queue.

17. The system of claim 15, wherein the path comprises a Uniform Resource Locator (URL).

18. The system of claim 15, wherein the queued message is received through a guaranteed delivery message service.

19. The system of claim 15, wherein the logic that writes is conditioned on the read from the source data store being successful.

20. The system of claim 15, wherein the synchronization target code further comprises logic that, if the read from the source data store was not successful, acknowledges the queued message without writing the data returned by the read to the strongly consistent data store.

21. The system of claim 15, wherein the write transaction is performed by a producer process and the logic that reads is executed by a consumer process.

* * * * *